Dec. 29, 1936.  E. R. HARRALL ET AL  2,066,276
CHUCK OR COUPLING
Filed June 12, 1934

INVENTORS
E. R. HARRALL
J. P. REIS
BY Eugene E. Brown
ATTORNEY

Patented Dec. 29, 1936

2,066,276

UNITED STATES PATENT OFFICE 2,066,276

CHUCK OR COUPLING

Edwin R. Harrall, Englewood, N. J., and John P. Reis, Hempstead, N. Y., assignors to The Western Union Telegraph Company, New York, N. Y., a corporation of New York Application June 12, 1934, Serial No. 730,336

4 Claims. (Cl. 255—63)

This invention relates to chucks or couplings for securing one member to another, such as coupling bits to shanks in percussive tools and the like. However, as will be apparent to those skilled in the art, its use is not limited to this particular type of device. More particularly, the invention is directed toward a form of chuck or coupling embodying a sleeve, the outer surface of which is tapered and radially divided at one end to form finger-like jaw members disposed to grip the member to be chucked by being pressed into engagement therewith by a tapered collar forced upwardly over the outer tapered surface of the sleeve.

The principal object of the invention is to provide a coupling of this nature having greater holding power under conditions of use, than couplings as heretofore provided.

In many prior art forms of coupling devices, such as chucks, the jaws or engaging members of the sleeve for holding the removable element are formed of a plurality of finger members extending outwardly from a rigid base and arranged to be brought into tight or gripping engagement with the removable element by means of a tapered collar which is forced inwardly over the fingers, toward the base portion. Typical of such an arrangement would be a tubular sleeve member having its outer end slotted at a number of points around its periphery so as to form fingers which extend outwardly and which may be brought into gripping engagement with a member mounted in the tube by means of a tapered collar forced over the outer surface of the fingers. Usually the tube or sleeve would be tapered at the end so as to permit better contact with the tapered collar.

When the jaw members of the sleeve stand out stiffly from a rigid base and have a substantially uniform thickness or a thickness tapering toward the outer end and are brought against the chucked member, they flex or bend somewhat as cantilever springs, producing a rounding or warping of the longitudinal elements of the outer surface into arcuate form.

When a collar having a single taper inner surface is forced over these jaw fingers to cause the same to assume a gripping position, the collar engages the fingers only with a circumferential line or a narrow contact surface or band of comparative small area due to the arcuate form of the exterior surface of the elements or jaw fingers and will not successfully hold the fingers in gripping position against vibration, shock, or other forces tending to loosen their grip.

A more specific object, therefore, is to improve the holding power of the coupling by providing a collar or collars which fit over the gripping fingers of the chuck sleeve or coupling to engage the fingers with more than a line contact as they assume a curved form.

The tubular sleeve may be in the form of a coupling that is slotted to form fingers at both ends and arranged to grip the adjacent ends of two longitudinally extending elements to be coupled together. The external surface of the sleeve may be tapered toward both ends from the center and fitted with two collars. On the other hand, where the coupling is subjected to longitudinal shock, as in percussive tools, the entire sleeve is tapered toward one end, and fitted with one or more collars. The embodiment of this invention illustrated and described hereinafter is of the latter type.

In accordance with this invention, we provide a collar or collars ground with more than one taper. In other words, a certain longitudinal portion or zone of the collar is ground with one taper, another zone with another taper. The collar may be divided into any desired number of zones or portions and each zone ground with a taper different from the others. Although the preferred embodiment described hereinafter consists of a single tapered sleeve, with a plurality of collars, at least one of which embodies more than one taper, we may provide a single collar embodying a single tapered surface and a sleeve having a plurality of tapered zones or areas of successively increased taper, such as will be described hereinafter as a modification of this invention.

For a better understanding of this invention, reference may be had to the accompanying drawing forming a part of this application in which:

Fig. 2 being an enlarged sectional view of an element shown in Fig. 1.

Figure 1:
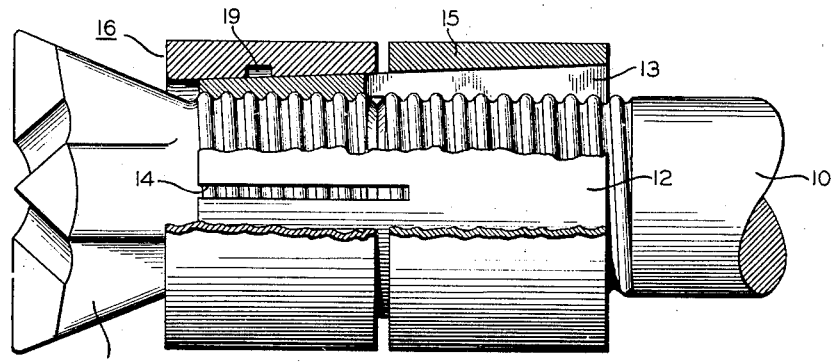
Figs. 1 and 2 are views partly in section showing the preferred form of the invention embodied in a percussive tool, such as a rock drill having a renewable bit held to a shank by a threaded sleeve over which are fitted tapered collars.
Figure 2:
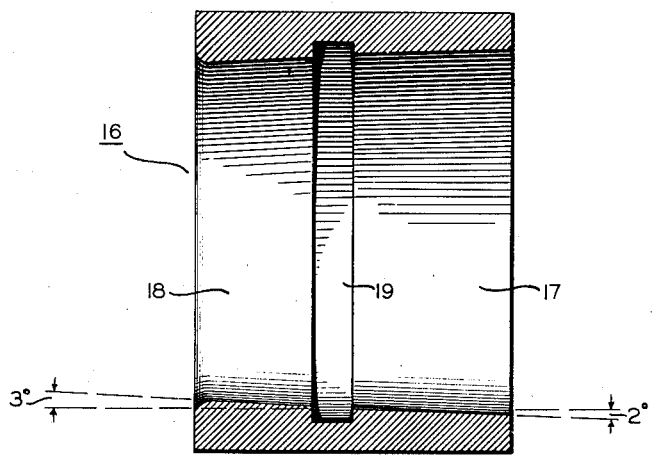

Referring to Fig. 1, the embodiment comprises a shank 10 of a rock drill or the like, to which is coupled a renewable bit 11 by means of a threaded sleeve 12. The shank and the bit have threads corresponding to the threads of the sleeve. However, as will appear in the modified form of the invention, the interlocking surfaces of the sleeve and the coupled members may embody means other than threads, such as knurled surfaces or other surfaces which suitably join or interlock. In the form illustrated the elements are coupled together by the shank being screwed into the sleeve from one end and the bit into the sleeve from the other end. Due to the fact that the driving percussions come from the outer end of the shank, the outer surface of the sleeve 12 is tapered inwardly from the upper or shank end toward the bit end. In other words, the sleeve is thicker in cross section at the shank than at the bit end.

In order to permit the sleeve to grip the shank and the bit respectively, the sleeve is slotted. In its preferred form pairs of diametrically opposed slots 13 and 14 are cut from a point somewhat beyond the center of the sleeve out to the end. Both ends of the sleeves are slotted in this manner, the pair of slots 13 being spaced radially from the other pair 14. The slots 14 provide fingers 21 and 22 the action of which during assembly will be described. When the unit is assembled, the shank is inserted into the sleeve 12 and a tapered collar 15 is driven over the sleeve until the latter has been made to seize the shank. In practice it has been found unnecessary, in connection with the particular type of device described herein, to provide the collar 15 with more than one taper. This is primarily because the shank is mounted in the sleeve first, leaving the bit end free during that procedure. As the collar is driven over the shank end of the sleeve, the opposite parts of the sleeve formed between the slots comprising the chuck fingers of that end of the sleeve, are substantially free to bend inwardly, since the other end of the sleeve is free to spread to permit such action. For this reason a collar 15 with a taper corresponding to the taper of the sleeve 12 when in gripping position upon the shank will effectively engage the sleeve over substantially all of its inner surface.

After the shank has been mounted in the sleeve, the bit 11 is then inserted in the opposite end until it comes against the end of the shank member 10. It will be observed now that the sleeve mounted on the shank is substantially a rigid or solid member having its outer end slotted to form the fingers 21 and 22 which, in order to be brought into engagement with the bit, must be bent or flexed inwardly with an action similar to that already described, which produces a rounding or arcing of the outer tapered surface of the sleeve elements. When this flexure of the fingers occurs, the conicity of the finger surfaces increases as the tips of the fingers are approached. It is preferably at this end that a collar 16 embodying, according to this invention, more than one taper, is employed. In the form illustrated in the drawing the collar incorporates two tapers. However, any number of tapers desirable for producing a proper contact may be employed. The difference between this arrangement and one in which the collar and sleeve have a single taper of the same pitch is that the cooperating surface portions having relatively different tapers tend to converge causing a greater transverse movement in that area, whereas with single tapers at the same pitch substantially the same transverse movement tends to occur in all areas.

In preparing the collar 16 it is preferable to divide the inner surface into longitudinal sections 17 and 18 separated by a groove 19. However, such separating grooves are not essential to carrying out this invention. Section 17 at the larger end of the collar up to the groove is ground with a small taper. In the device illustrated the taper is approximately two degrees. The section 18 from the groove toward the smaller end is ground with an increased taper. This taper in the illustration is about three degrees. Although the tapers are described as being ground, they may be formed in any other suitable manner.

In assembling the unit, the collar 16, which will have been placed loosely over the sleeve before the bit 11 is inserted, is forced upwardly over the sleeve 12. As the collar moves into position, the section 17 at the larger end will grip the finger portions 21 and 22 of the sleeve nearer their roots. The finger portions at their outer ends, where the cooperating tapered surfaces are convergent instead of parallel, will be gripped and bent inwardly relatively more by the increasing taper of the outer end 18 of the collar. With this arrangement the gripping fingers of the chuck sleeve 12 are forced inwardly and caused to assume their natural curved form while at the same time they are engaged over a substantial area of each of the differently tapered ends of the collar. It has been found that this type of arrangement will cause the bit to be retained with a better grip than when the device is fitted with a collar of a single taper at the smaller end.

A rock drill having a removable bit clamped in the sleeve coupling formed according to the above description, has proved entirely satisfactory in extensive practical operating tests. The unit has been employed as a hand operated rock drill as well as a machine driven drill. Ordinarily, when driven by the well known type of pneumatic hammer, the drill is automatically operated to rotate solely in a direction which would cause tightening of the threaded sleeve connection. As a result there would be little tendency for the bit to work loose.

On the other hand, when the device is employed as a hand operated drill, or in a nonrotating type of percussive tool, it should be a unit which would require no special precaution as to the direction in which it is turned to properly distribute the bit cut in the hole. It is under such conditions, where any special directions as to the method of operation would not be observed to any extent, that the invention described herein finds its most useful application. It has been found that drill bits operated or only turned by hand, when held to the shank by the type of coupling described, are held as effectively as when machine turned and showed no greater tendency toward working loose, or toward admissions of rock dust and the like into the joint which would cause wear.

Substantially the same effect may be obtained by forming a plurality of tapers on the sleeve instead of in the collars. In such a device the peripheral portion of the sleeve or finger elements is formed, in bands or otherwise, with a taper decreasing toward one end of an amount suitable to present a substantially straight surface after the fingers have been flexed inwardly by the force of the driven collar to a tight gripping position. Then a collar with a uniform taper may be driven over the sleeve and will engage the outer ends of the finger elements and force them to flex inwardly to a tight gripping position and eventually engage substantially the entire peripheral area of the finger elements in the same manner as in the previous embodiment. In other words, with this arrangement, as well as that previously described, the movement inwardly of the fingers or jaws for a predetermined movement of the collar will be greater at the tips that at points away from the tips toward the central portion of the sleeve.

Figure 3:
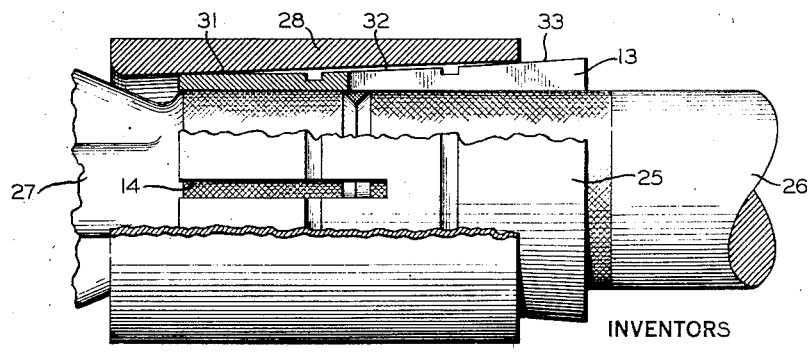
Fig. 3 is a view partly in section of a modified form of the invention employing a structure similar to that shown in Figs. 1 and 2 with the exception of the surface in which the plurality of tapers is embodied and the interlocking surface between the sleeve and the coupled members.

A modified form of this invention embodying the features just recited and other features is illustrated in Fig. 3. It comprises a sleeve 25 arranged to grip a shank 26 in one end and a bit 27 in the other. The sleeve is slit or slotted with pairs of slots 13 and 14 as in the previously described embodiment. It is to be understood, however, that the sleeve may be divided by any suitable number of slots to form any desired additional number of fingers at either end.

In the embodiment shown in Fig. 3 the internal surfaces of the sleeve and the gripped shank and bit respectively are not provided as interthreaded surfaces but are interlocked by means of knurling the engaging surfaces of the respective members. In order to cause the sleeve 13 to suitably grip the shank 26 and bit 27, any suitable roughened surface having small upstanding portions which interlock under pressure will prove satisfactory. The surfaces may be knurled rather lightly and in that manner the fit between the sleeve and the member that is gripped thereby made a very close one. Fitted in this manner it is very easy to bring the slit sleeve into very firm gripping engagement with the gripped or chucked members by means of the collar 28 which is driven over the sleeve in a manner presently to be described. It will be apparent to those skilled in the art that other methods of interlocking engagement between the inner surface of the sleeve 25 and the chucked members 26 and 27 may be provided.

According to the modification illustrated in Fig. 3, the multiple tapers provided according to this invention are embodied in the sleeve 25 rather than in the shroud collar 28. In addition the sleeve is encircled by a single collar 28 instead of by separate collars operating on opposite ends of the sleeve as in the previously described embodiment. The sleeve 25 may be divided into any suitable number of sections or zones. In the illustration the sleeve is divided into three sections or zones, 31, 32 and 33. Beginning at the small or thin end of the sleeve the first zone 31 is formed with a relatively small taper which in its preferred form will be a taper relatively smaller than that provided on the interior surface of the collar 28. The next zone 32 will be formed with a slightly greater taper. The taper of this zone may be substantially the same as that of the interior surface of the collar. The next zone 33 being the zone at the large end of the sleeve will be formed with a taper slightly greater than the zone 32. This zone may have a taper slightly greater than that of the inner surface of the collar. These tapers are preferably so proportioned in relation to each other and in relation to the movement which will take place at the outer ends of the sleeve 25, that when the sleeve is brought firmly into gripping relation with the chucked elements, the several zones of the sleeve will have assumed substantially a straight line.

When the sleeve has been provided as described, a single tapered collar 28 provided with a taper of a suitable pitch or angle may be driven over the sleeve to simultaneously cause both ends of the sleeve to grip the elements or members enclosed therein. When suitably proportioned, the collar 28 may be fitted loosely over the sleeve 25 and the members 26 and 28 inserted in the opposite ends of the sleeve in readiness to be coupled together. The coupling action is then brought about by the collar 28 being driven upwardly over the tapered sleeve. At the beginning of the drive the collar 28 is preferably arranged to so fit over the sleeve 25 that it first engages the zones at the small end of the sleeve and subsequently that at the large end of the sleeve. As the collar is driven to its normal position the opposite ends of the sleeve will be flexed or moved inwardly substantially as already described until they have come to a position substantially in alinement with the central zone 32 of the sleeve. When this position is reached, the collar 28 will be in engagement with substantially the entire external surface of the sleeve including that of the middle zone 32 as well as the upper and lower zones 31 and 33.

Many other applications of this invention will appear to those skilled in the art, such as shaft couplings, machine tool couplings or chucks and the like. It is likewise apparent to those skilled in the art that a chuck or coupling devised according to this invention may take many different forms without departing from the scope thereof.

Although this invention is shown in but two forms, it may be embodied in various other forms and arrangements without departing from the spirit thereof, and it is desired therefore that only such limitations shall be placed thereon as are imposed by the prior art or as set forth in the appended claims.

What we claim is:

1. In a chuck for percussive tools, a chuck jaw collar substantially circular in cross section and having a plurality of longitudinal zones each of considerable length comprising its inner surface formed with different tapers increasing consecutively from the large toward the small end.

2. In a coupling device for percussive tools embodying a sleeve split inwardly from one end and arranged to surround a portion of a member to be coupled to the sleeve, the outer surface of said sleeve being tapered, a collar substantially circular in cross section having a tapered inner surface arranged to cooperate with the outer surface of said sleeve so that when the collar is forced from an off position toward an on position over the tapered sleeve it will force the split end of the sleeve inwardly against the coupled member for gripping the same, the inner surface of said collar having a single taper, the cooperating surface of said sleeve being provided with a plurality of zones each of considerable length and having different tapers whereby the zone adjacent the end of the sleeve is so related to the collar that a greater transverse movement is imparted at this point than in zones remote from the end of the sleeve as the collar is forced on.

3. In a chuck or coupling device for percussive devices embodying jaws in the form of finger members held substantially fixed at their roots and presenting a substantially continuous conical outer surface initially, said jaws being arranged to be closed upon an object to be chucked by flexing the finger members inwardly whereby said conical surface is modified to a surface of increasing conicity as the tips of the fingers are approached, a conical collar for closing said jaws by being forced upwardly over said conical surface, said finger surfaces and the coacting surface of said collar initially having substantially the same conicity adjacent the roots of the fingers and different degrees of conicity remote from said roots, said surface of different conicities converging in a direction toward the ends of said fingers, whereby the imposed deflection of the fingers inwardly corresponding to a given movement of the collar upwardly over said conical surface is greater adjacent their tips than adjacent the roots thereof.

4. The combination defined in claim 3 wherein the outer surface of the said object to be chucked and the surfaces of said jaws cooperating therewith are provided with interlocking protuberances.

EDWIN R. HARRALL.
JOHN P. REIS.